(12) United States Patent
Ma et al.

(10) Patent No.: US 12,456,282 B2
(45) Date of Patent: Oct. 28, 2025

(54) ULTRASOUND IMAGING METHOD AND SYSTEM FOR IDENTIFYING AN ANATOMICAL FEATURE OF A SPINE

(71) Applicants: National University of Singapore, Singapore (SG); Singapore Health Services Pte. Ltd., Singapore (SG)

(72) Inventors: Jun Ma, Singapore (SG); Kok Kiong Tan, Singapore (SG); Ban Leong Sng, Singapore (SG); Tiong Heng Sia, Singapore (SG)

(73) Assignees: National University of Singapore, Singapore (SG); Singapore Health Services Pte. Ltd., Singapore (SG)

( * ) Notice: Subject to any disclaimer, the term of this patent is extended or adjusted under 35 U.S.C. 154(b) by 477 days.

(21) Appl. No.: 17/790,524

(22) PCT Filed: Dec. 28, 2020

(86) PCT No.: PCT/SG2020/050786
§ 371 (c)(1),
(2) Date: Jul. 1, 2022

(87) PCT Pub. No.: WO2021/137761
PCT Pub. Date: Jul. 8, 2021

(65) Prior Publication Data
US 2023/0034589 A1  Feb. 2, 2023

(30) Foreign Application Priority Data
Jan. 3, 2020 (SG) ............ 10202000060V

(51) Int. Cl.
*A61B 8/08* (2006.01)
*A61B 8/00* (2006.01)
(Continued)

(52) U.S. Cl.
CPC ........... *G06V 10/764* (2022.01); *A61B 8/085* (2013.01); *A61B 8/0875* (2013.01);
(Continued)

(58) Field of Classification Search
CPC .................................................. G06T 7/0012
See application file for complete search history.

(56) References Cited

U.S. PATENT DOCUMENTS 5,758,650 A   6/1998  Miller et al.
10,004,450 B2  6/2018  Moskowitz et al.
(Continued)

FOREIGN PATENT DOCUMENTS

CN   109561875 A   4/2019
CN   109646089 A   4/2019
(Continued)

OTHER PUBLICATIONS

The International Search Report and The Written Opinion of the International Searching Authority for PCT/SG2020/050786, Date of Mailing: Apr. 1, 2021.
(Continued)

*Primary Examiner* — Di Xiao
(74) *Attorney, Agent, or Firm* — Botos Churchill IP Law LLP

(57) ABSTRACT

Ultrasound imaging methods for identifying an anatomical feature of a spine are described. In an embodiment, the method comprises: receiving a transverse ultrasound image of a portion of the spine; extracting features of the portion of the spine from the image based on a distinct pattern associated with the anatomical feature of the spine; identifying a midline of the portion of the spine in the image; extracting midline features using pixel intensity values of the image; and identifying, based on a combination of the extracted features of the portion of the spine and the
(Continued)

extracted midline features, the anatomical feature in the image. In another embodiment, the method comprises: receiving a paramedian sagittal ultrasound image of a portion of the spine; identifying morphological features of the image; and determining if the portion of the spine includes a sacrum using a Support Vector Machine classifier.

15 Claims, 7 Drawing Sheets

(51) Int. Cl.

| | | |
|---|---|---|
| G06T 7/246 | (2017.01) | |
| G06T 7/62 | (2017.01) | |
| G06T 7/66 | (2017.01) | |
| G06V 10/10 | (2022.01) | |
| G06V 10/44 | (2022.01) | |
| G06V 10/75 | (2022.01) | |
| G06V 10/764 | (2022.01) | |
| A61B 17/34 | (2006.01) | |

(52) U.S. Cl.
CPC .......... *A61B 8/4444* (2013.01); *A61B 8/5223* (2013.01); *A61B 8/5246* (2013.01); *G06T 7/248* (2017.01); *G06T 7/62* (2017.01); *G06T 7/66* (2017.01); *G06V 10/16* (2022.01); *G06V 10/44* (2022.01); *G06V 10/751* (2022.01); *A61B 2017/3413* (2013.01); *G06T 2207/10132* (2013.01); *G06T 2207/30012* (2013.01)

(56) References Cited

U.S. PATENT DOCUMENTS

| | | | |
|---|---|---|---|
| 10,383,610 B2 | 8/2019 | Moskowitz et al. | |
| 2007/0073155 A1 | 3/2007 | Park et al. | |
| 2007/0242869 A1* | 10/2007 | Luo | G06T 7/0012 |
| | | | 382/132 |
| 2008/0118139 A1* | 5/2008 | Huo | G06T 5/40 |
| | | | 382/132 |
| 2009/0275892 A1 | 11/2009 | Molnar | |
| 2011/0172526 A1 | 7/2011 | Lachaine et al. | |
| 2011/0313323 A1* | 12/2011 | Henderson | A61B 17/7055 |
| | | | 606/279 |
| 2012/0296213 A1 | 11/2012 | Mauldin et al. | |
| 2013/0197355 A1 | 8/2013 | Lee et al. | |
| 2016/0022308 A1 | 1/2016 | Rohling | |
| 2016/0249879 A1 | 9/2016 | Mauldin et al. | |
| 2016/0292853 A1* | 10/2016 | Dong | G06T 7/12 |
| 2018/0153620 A1 | 6/2018 | Leenstra | |
| 2019/0029757 A1* | 1/2019 | Roh | A61B 34/20 |
| 2019/0117187 A1 | 4/2019 | Patel et al. | |
| 2019/0192114 A1* | 6/2019 | Mauldin, Jr. | A61B 8/085 |
| 2019/0262609 A1* | 8/2019 | Brill | A61N 1/36071 |
| 2019/0282262 A1 | 9/2019 | Bouazza-Marouf et al. | |
| 2021/0045715 A1* | 2/2021 | Mauldin | G16H 50/20 |
| 2021/0085283 A1* | 3/2021 | Zheng | G01S 15/8993 |

FOREIGN PATENT DOCUMENTS

| | | |
|---|---|---|
| EP | 1983899 B1 | 10/2010 |
| EP | 2766073 B1 | 12/2016 |
| EP | 3466365 A1 | 4/2019 |
| GB | 2400176 B | 2/2006 |
| RU | 2516554 C2 | 5/2014 |
| WO | 2016020565 A1 | 2/2016 |
| WO | 2017007875 A1 | 1/2017 |
| WO | 2018101985 A1 | 6/2018 |
| WO | 2019136412 A1 | 7/2019 |

OTHER PUBLICATIONS

Leng , et al., "Development of a Real-time Lumbar Ultrasound Image Processing System for Epidural Needle Entry Site Localization", IEEE, 2016, pp. 4093-4096.

Oh , et al., "A Novel Approach to Neuraxial Anesthesia: Application of an Automated Ultrasound Spinal Landmark Identification," BMC Anesthesiology, vol. 19, No. 57, 2019, pp. 1-8.

Yu , et al., "Lumbar Ultrasound Image Feature Extraction and Classification with Support Vector Machine," Ultrasound in Med. & Biol., vol. 41, No. 10, 2015, pp. 2677-2689.

Yu , et al., "Real-time Automatic Spinal Level Identification with Ultrasound Image Processing," IEEE, 2015, pp. 243-246.

Vaughan, et al., Interpreting Ultrasound Images for Accurate Epidural Needle Insertion, Jun. 2017, Journal of Medical Devices 11(3).

Elsharkawy , et al., "Localization of Epidural Space: A Review of Available Technologies", Journal of Anesthesiology Clinical Pharmacology, 2017, vol. 33, Issue 1, 2017, pp. 16-27.

Beigi, "Image-based Enhancement and Tracking of an Epidural Needle in Ultrasound Using Time-series Analysis", The University of British Columbia, 2017, 165 Pages.

Pesteie , et al., "Automatic Localization of the Needle Target for Ultrasound-Guided Epidural Injections", IEEE Transactions on Medical Imaging, vol. 37, No. 1, 2018, pp. 81-92.

Yu , et al., "Classification of Lumbar Ultrasound Images with Machine Learning", G. Dick et al. (Eds.); Seal 2014, LNCS 8886, 2014, Springer International Publishing Switzerland, pp. 287-298.

Yu , et al., "Ultrasound Guided Automatic Localization of Needle Insertion Site for Epidural Anesthesia", IEEE International Conference on Mechatronics and Automation, 2013, pp. 985-990.

The First Chinese Office Action for Chinese Patent Application No. 202080091818.2, Dec. 26, 2024, 28 Pages.

The Second Office Action for Chinese Patent Application No. 202080091818.2, May 21, 2025, 23 Pages.

Luchin, Basic Technique of Veterinary Surgery, Section 5: Epidural Anesthesia, River South Scientific, Mar. 31, 1983, p. 87.

The Third Office Action for Chinese Patent Application No. 202080091818.2, Sep. 10, 2025, 25 Pages.

Lange, et al., "Netter's Cardiology", People's Military Medical Press, 2015, 4 Pages.

Xin, "New Concise Clinical Diagnosis", Heilongjiang Science and Technology Press, 2008, 4 Pages.

Yang, et al., "Ultrasound Diagnosis of Superficial Lymphatic Diseases", Chinese Medical Electronics Audio and Video Publishing House, 2019, 3 Pages.

* cited by examiner

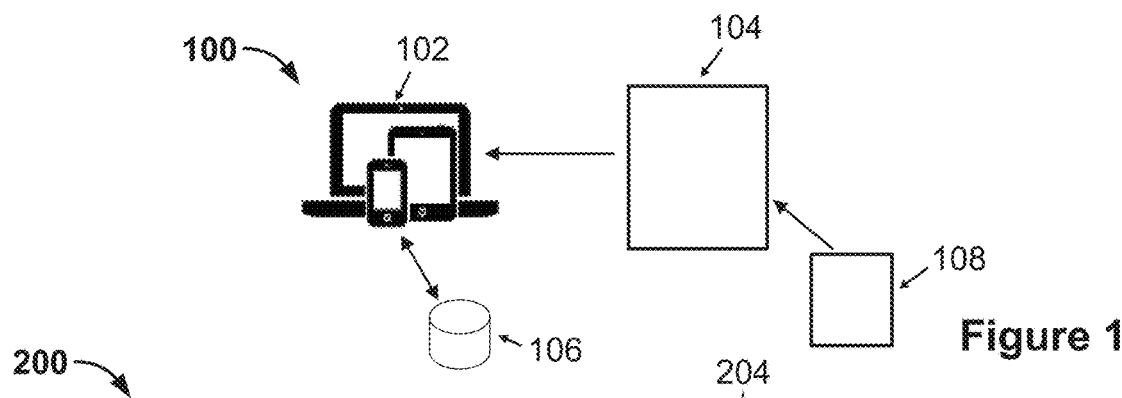
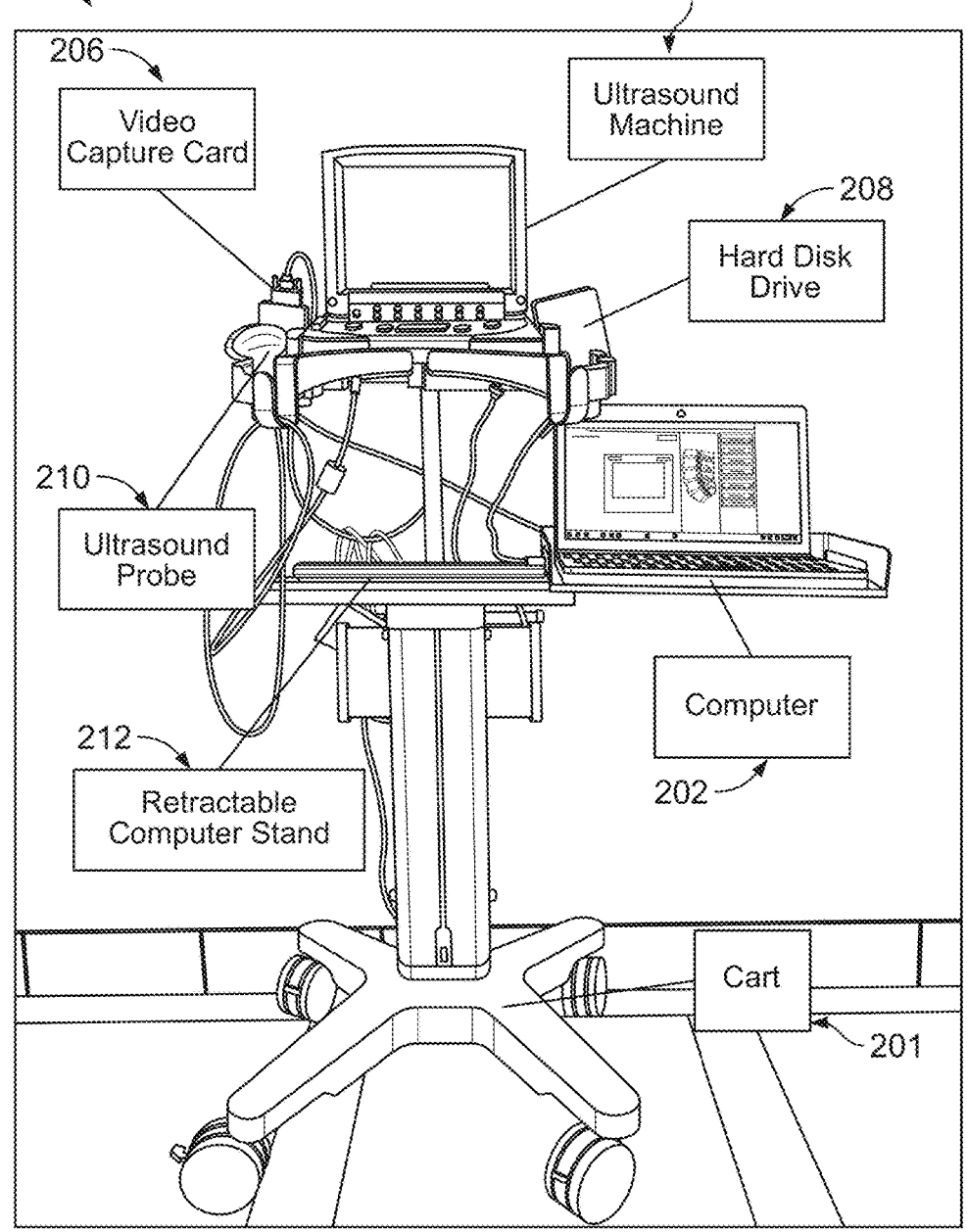

ULTRASOUND IMAGING METHOD AND SYSTEM FOR IDENTIFYING AN ANATOMICAL FEATURE OF A SPINE

CROSS-REFERENCE TO RELATED APPLICATIONS

The present application is a national phase entry under 35 U.S.C. § 371 of International Application No. PCT/SG2020/050786, filed Dec. 28, 2020, published in English, which claims the benefit of the filing date of Singapore Patent Application No. 10202000060V, filed Jan. 3, 2020, the disclosures of which are incorporated herein by reference.

TECHNICAL FIELD

The present disclosure relates to an ultrasound imaging method and system for identifying an anatomical feature of a spine.

BACKGROUND

Neuraxial procedures are commonly performed with a wide range of therapeutic and diagnostic indications. Examples of neuraxial procedures include neuraxial anesthesia for surgery, epidural labour analgesia, epidural steroid injections and lumbar punctures.

In order to perform the neuraxial procedures, a location for needle insertion at an appropriate spinal level of a spine and a pathway to a neuraxial space of the spine are required to be determined.

At present, a blind palpation landmark method for identifying the location for needle insertion and for determining the pathway to the neuraxial space is commonly used. However, this method is highly inaccurate as it is heavily dependent on the relevant skills and experience of a practitioner who is performing the neuraxial procedure. The blind palpation landmark method may be further complicated if it is performed on obese patients or patients with back injuries since anatomical landmarks cannot be reliably palpated in these cases. The blind palpation landmark method may therefore result in multiple insertion attempts, thereby causing a patient to undergo unnecessary suffering and increasing a risk of complications such as a spinal cord injury in the patient.

In light of the above, neuraxial ultrasonography has become popular for neuraxial space identification as it is shown to be a safe and effective method. With its increasing use as an auxiliary to physical examination, an overall success rate of epidural and spinal administration, and lumbar puncture is enhanced and the number of injection attempts is reduced. Nonetheless, in many conventional ultrasound systems, artifacts are generated from off-axis reflections. Further, two-dimensional ultrasound images are difficult to interpret, and require the aid of experienced practitioners to make use of these images. Further, inconsistency may arise as interpretation of these ultrasound images is highly dependent on the skills of the practitioners.

It is therefore desirable to provide a system and method for identifying an anatomical feature of a spine which address the aforementioned problems and/or provides a useful alternative. Further, other desirable features and characteristics will become apparent from the subsequent detailed description and the appended claims, taken in conjunction with the accompanying drawings and this background of the disclosure.

SUMMARY

Aspects of the present application relate to an ultrasound imaging method and system for identifying an anatomical feature of a spine.

In accordance with a first aspect, there is provided an ultrasound imaging method for identifying an anatomical feature of a spine, the method comprising: receiving, by a processor, a transverse ultrasound image of a portion of the spine; extracting, by the processor, features of the portion of the spine from the transverse ultrasound image based on a distinct pattern associated with the anatomical feature of the spine; identifying, by the processor, a midline of the portion of the spine in the transverse ultrasound image; extracting, by the processor, midline features using pixel intensity values of the transverse ultrasound image; and identifying, by the processor based on a combination of the extracted features of the portion of the spine and the extracted midline features, the anatomical feature in the transverse ultrasound image.

By using a combination of the extracted features of the spine and the extracted midline features, the anatomical feature in the transverse ultrasound image can be identified with increased accuracy. Further in an embodiment where the anatomical feature includes a neuraxial space, by identifying the neuraxial space using the extracted features, an optimal position and tilt angle for performing a neuraxial procedure can be obtained. For example, presence and/or locations of the identified features provide an indication of whether the optimal position and/or tilt angle have been achieved. This optimal position can then be marked for performing the neuraxial procedure.

Where identifying the midline of the spine may comprise using, by the processor, a cost function associated with a presence of white pixels within a predefined window of the ultrasound image, wherein the cost function includes a first term associated with a depth of the pixels and a second term associated with a position of the midline in relation to a centre of the transverse ultrasound image.

The method may comprise: receiving, by the processor, a paramedian sagittal ultrasound image of another portion of the spine; identifying, by the processor, morphological features of the paramedian sagittal ultrasound image for classifying the another portion of the spine, the morphological features comprise one or more of: a contour linearity, a size, a centre location and an area of the paramedian sagittal ultrasound image; and determining, by the processor based on the identified morphological features, if the another portion of the spine includes a sacrum.

Where identifying the morphological features of the paramedian sagittal ultrasound image may comprise identifying, by the processor, the morphological features using template matching, and the method may comprise identifying, by the processor, an interspinous space based on the identified morphological features of the paramedian sagittal ultrasound image.

Where the another portion of the spine is determined to include the sacrum, the method may comprise: receiving, by the processor, a further paramedian sagittal ultrasound image of the spine; determining, by the processor based on template matching of (i) laminas of the spine in the paramedian sagittal ultrasound image and the further paramedian sagittal ultrasound image and (ii) a cross relation strength between the paramedian sagittal ultrasound image and the further paramedian sagittal ultrasound image, if the further paramedian sagittal ultrasound image is suitable to be stitched to the paramedian sagittal ultrasound image; and stitching, by the processor, the further paramedian sagittal ultrasound image to the paramedian sagittal ultrasound image to form a portion of a panorama image of the spine if it is determined that the further paramedian sagittal ultrasound image is suitable to be stitched to the paramedian sagittal ultrasound image.

The method may comprise: identifying, by the processor, locations of interspinous spaces of the portion of the panorama image; and identifying, by the processor, spinal levels using the locations of the interspinous spaces.

Where identifying locations of interspinous spaces of the portion of the panorama image may comprise: calculating, by the processor, a motion between the further paramedian sagittal ultrasound image and a leading edge of the paramedian sagittal ultrasound image using phase correlation; and transforming, by the processor, coordinates of a centre of a ultrasound probe in respect of the portion of the panorama image.

The method may comprise: determining, by the processor, if the ultrasound probe is at an optimal level of the spine based on the identified spinal levels; and transmitting, by the processor, a request for obtaining the transverse ultrasound image of the portion of the spine if the ultrasound probe is at the optimal level.

The method may comprise pre-processing, by the processor, the transverse ultrasound image prior to extracting features of the portion of the spine and the midline.

Where pre-processing the transverse ultrasound image may comprise performing, by the processor, a contrast enhancement on the transverse ultrasound image using a Difference of Gaussians (DoG) local normalization filter.

Where pre-processing the transverse ultrasound image may comprise eliminating, by the processor, candidate contour points in the transverse ultrasound image using intensity thresholding.

The method may comprise pre-processing, by the processor, the paramedian sagittal ultrasound image prior to identifying the morphological features.

Where pre-processing the paramedian sagittal ultrasound image may comprise performing, by the processor, a contrast enhancement on the paramedian sagittal ultrasound image using a Difference of Gaussians (DoG) local normalization filter.

Where pre-processing the paramedian sagittal ultrasound image may comprise eliminating, by the processor, candidate contour points in the paramedian sagittal ultrasound image using intensity thresholding.

The method may comprise calculating, by the processor, a depth of the neuraxial space.

The method may comprise identifying, by the processor, the neuraxial space using a Support Vector Machine (SVM) classifier.

The method may comprise training, by the processor, the SVM classifier using historical data associated with the features of the portion of the spine and the midline features.

In accordance with a second aspect, there is provided a computer readable medium storing processor executable instructions which when executed on a processor cause the processor to carry out any preceding method.

In accordance with a third aspect, there is provided an ultrasound imaging system for identifying an anatomical feature of a spine, the system comprising: an ultrasound probe arranged to scan the spine for a transverse ultrasound image of a portion of the spine; and a computer comprising a processor and a data storing computer program instructions operable to cause the processor to: receive a transverse ultrasound image of the portion of the spine; extract features of the portion of the spine from the transverse ultrasound image based on a distinct pattern associated with the anatomical feature of the spine; identify a midline of the portion of the spine in the transverse ultrasound image; extract midline features using pixel intensity values of the transverse ultrasound image; and identify based on a combination of the extracted features of the portion of the spine and the extracted midline features, the anatomical feature in the transverse ultrasound image.

The anatomical feature of the spine may include a neuraxial space.

The extracted features of the portion of the spine may include one or more of: a depth of a posterior complex, a depth of an anterior complex, a normalized cross-correlation strength of the posterior complex, a normalized cross-correlation strength of the anterior complex, a location of a left articular process, a location of a right articular process, a normalized cross-correlation value of a left articular process, and a normalized cross-correlation value of a right articular process.

The extracted features of the portion of the spine may include a horizontal position of the posterior complex and a horizontal position of the anterior complex.

The extracted midline features may include a ratio of black pixels in a predefined window and a ratio of white pixels below the posterior complex.

The data storage may store computer program instructions operable to cause the processor to: identify the midline of the spine using a cost function associated with a presence of white pixels within the predefined window of the ultrasound image, wherein the cost function includes a first term associated with a depth of the pixels and a second term associated with a position of the midline in relation to a centre of the transverse ultrasound image.

The data storage may store computer program instructions operable to cause the processor to: receive a paramedian sagittal ultrasound image of another portion of the spine; identify morphological features of the paramedian sagittal ultrasound image for classifying the another portion of the spine, the morphological features comprise one or more of: a contour linearity, a size, a centre location and an area of the paramedian sagittal ultrasound image; and determine, based on the identified morphological features, if the another portion of the spine includes a sacrum.

The data storage may store computer program instructions operable to cause the processor to: identify the morphological features using template matching; and identify an interspinous space based on the identified morphological features of the paramedian sagittal ultrasound image.

Where the another portion of the spine is determined to include the sacrum, the data storage may store computer program instructions operable to cause the processor to: receive a further paramedian sagittal ultrasound image of the spine; determine, based on template matching of (i) laminas of the spine in the paramedian sagittal ultrasound image and the further paramedian sagittal ultrasound image and (ii) a cross relation strength between the paramedian sagittal ultrasound image and the further paramedian sagittal ultrasound image, if the further paramedian sagittal ultrasound image is suitable to be stitched to the paramedian sagittal ultrasound image; and stitch the further paramedian sagittal ultrasound image to the paramedian sagittal ultrasound image to form a portion of a panorama image of the spine if it is determined that the further paramedian sagittal ultrasound image is suitable to be stitched to the paramedian sagittal ultrasound image.

The data storage may store computer program instructions operable to cause the processor to: identify locations of interspinous spaces of the portion of the panorama image; and identify spinal levels using the locations of the interspinous spaces.

The data storage may store computer program instructions operable to cause the processor to: calculate a motion between the further paramedian sagittal ultrasound image and a leading edge of the paramedian sagittal ultrasound image using phase correlation; and transform coordinates of a centre of a ultrasound probe in respect of the portion of the panorama image.

The data storage may store computer program instructions operable to cause the processor to: determine if the ultrasound probe is at an optimal level of the spine based on the identified spinal levels; and transmit a request for obtaining the transverse ultrasound image of the portion of the spine if the ultrasound probe is at the optimal level.

The optimal level includes a location of the L3-L4 interspinous space of the spine.

The data storage may store computer program instructions operable to cause the processor to: pre-process the transverse ultrasound image prior to extracting features of the portion of the spine and the midline.

The data storage may store computer program instructions operable to cause the processor to: perform a contrast enhancement on the transverse ultrasound image using a Difference of Gaussians (DoG) local normalization filter.

The data storage may store computer program instructions operable to cause the processor to: eliminate candidate contour points of the transverse ultrasound image using intensity thresholding.

The data storage may store computer program instructions operable to cause the processor to: calculate a depth of the neuraxial space.

The data storage may store computer program instructions operable to cause the processor to: identify the neuraxial space using a Support Vector Machine (SVM) classifier.

The data storage may store computer program instructions operable to cause the processor to: train the SVM classifier using historical data of the features of the portion of the spine and the midline features.

The ultrasound probe may comprise a clamping system arranged to attach a needle to the ultrasound probe for performing a neuraxial procedure. The clamping system helps to secure the needle in close proximity to the ultrasound probe for accurate performance of the neuraxial procedure.

The clamping system may comprise a clip for attaching the needle using a spring loading mechanism.

The clamping system may comprise a locking mechanism for locking a position of the clip to fix a position and an angle of the needle.

The clamping system may be in a form of a cover for the ultrasound probe. In this way, the clamping system may be detachable from the ultrasound probe and can be replaced or maintained independently, if required.

In accordance with a fourth aspect, there is provided an ultrasound imaging method for identifying an anatomical feature of a spine, the method comprising: receiving, by a processor, a paramedian sagittal ultrasound image of a portion of the spine; identifying, by the processor, morphological features of the paramedian sagittal ultrasound image for classifying the portion of the spine, the morphological features comprise one or more of: a contour linearity, a size, a centre location and an area of the paramedian sagittal ultrasound image; and determining, by the processor, if the portion of the spine includes a sacrum, wherein determining if the portion of the spine includes a sacrum comprises using a Support Vector Machine (SVM) classifier to determine if the portion of the spine includes a sacrum based on the identified morphological features, the SVM classifier being trained using historical data associated with the morphological features of the sacrum.

It should be appreciated that features relating to one aspect may be applicable to the other aspects. Embodiments therefore provide an ultrasound imaging method and system for identifying an anatomical feature of a spine. Particularly, by using a combination of the extracted features of the portion of the spine and the extracted midline features, the anatomical feature of the spine in the transverse ultrasound image can be identified with increased accuracy. Further, in embodiments where the anatomical feature is an neuraxial space of the spine, by identifying the neuraxial space using the extracted features, an optimal position and tilt angle for performing a neuraxial procedure can be obtained for performing a neuraxial procedure.

BRIEF DESCRIPTION OF THE DRAWINGS

Embodiments will now be described, by way of example only, with reference to the following drawings, in which:

FIG. 1 shows a schematic diagram of an ultrasound imaging system for identifying a neuraxial space in a spine in accordance with an embodiment;

FIG. 2 shows a photograph of the system of FIG. 1 in accordance with an embodiment;

DETAILED DESCRIPTION

Figure 3:
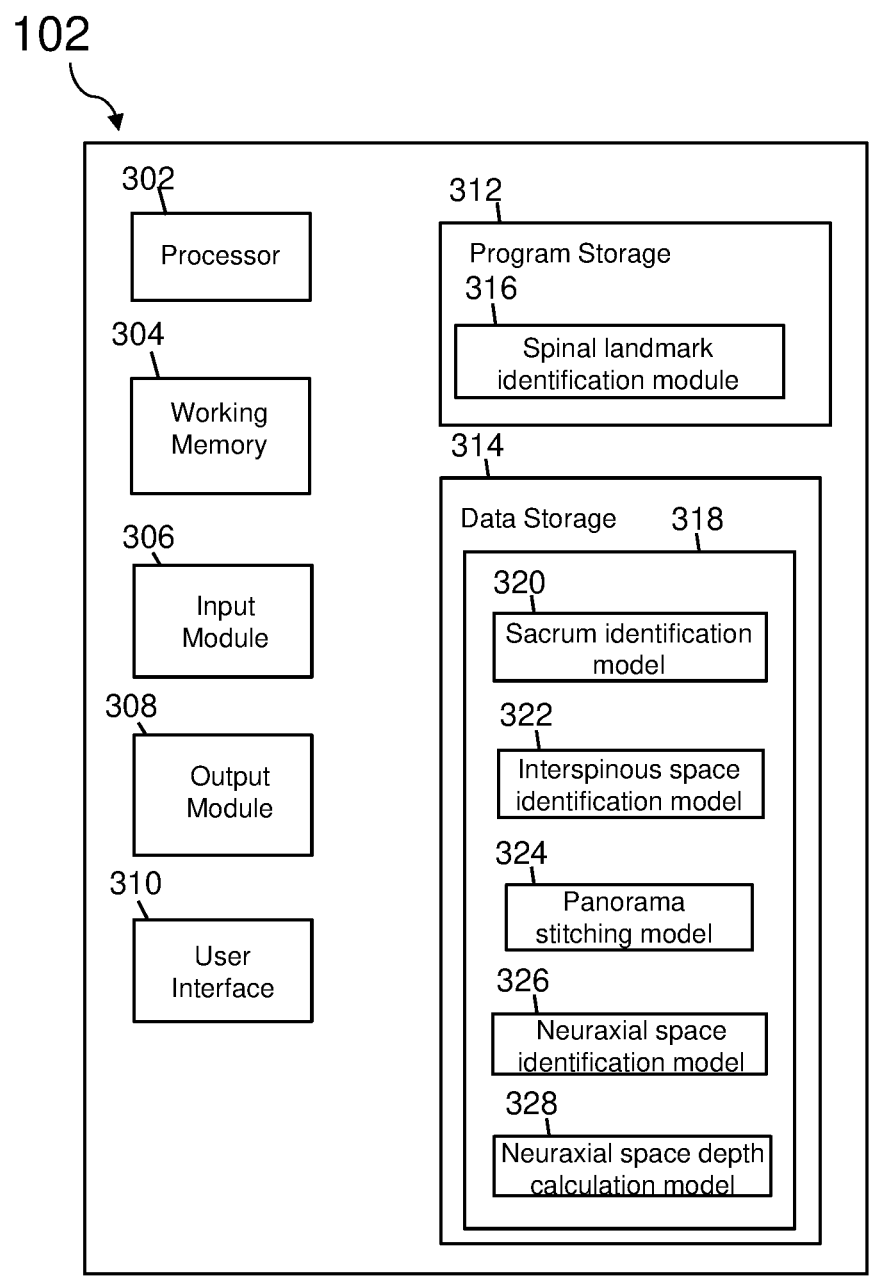
FIG. 3 shows a block diagram of a computer of the system of FIG. 1.

Exemplary embodiments relate to an ultrasound imaging method and system for identifying a neuraxial space in a spine.

FIG. 1 shows a schematic diagram of an ultrasound imaging system 100 for identifying a neuraxial space in a spine in accordance with an embodiment. The system 100 comprises a computer 102 and an ultrasound machine 104. The computer is in communication with the ultrasound machine 104 for receiving ultrasound images captured by the ultrasound machine 104. The computer 102, together with its operating system and its installed programmes, are configured to perform the operations as discussed in methods 500 and 600 below. In addition, the system 100 comprises a database 106 in communication with the computer 102. The database 106 is a hardware component such that data can be transferred to and from the database 106 and be processed at the computer 102. In the present embodiment, the database 106 is an external hard disk drive. The system 100 comprises an ultrasound probe 108 which is in communication with the ultrasound machine 104. The ultrasound probe 108 functions to generate ultrasound waves which are transmitted through a patient's body for identifying anatomical structures, such as a spine, within the patient's body. The transmitted ultrasound waves are reflected by the anatomical structures and are received by the ultrasound probe 108. These received ultrasound waves are converted to electrical signals which are used to form an ultrasound video or image in the ultrasound machine 104. The raw video and/or image data signals are in turn transmitted from the ultrasound machine 104 to the computer 102 for further processing, for example in accordance with methods 400 and 500 which will be described below.

FIG. 2 shows a photograph of the system 100 of FIG. 1 in accordance with an embodiment. In particular, FIG. 2 shows a compact system 200 which can be integrated with a cart 201 for increased mobility. This is especially important in a clinical setting since the entire system 200 can be moved about on the cart 201 to be used on different patients at various locations. Further, it is clear that the compact ultrasound imaging system 200 has the advantage of being easily integrated with existing ultrasound machines. For example, to implement the present methods, only a computer 202 is required to be connected to a ultrasound machine 204 for receiving video or image data from the ultrasound machine 204 for image processing.

The computer 202 comprises at least an application installed for executing methods 400 and 500 for processing ultrasound images received from the ultrasound machine 204. The computer 202 is configured to receive inputs from the ultrasound machine 204 via a video capture card 206. The video capture card 206 functions to receive raw video and/or image signals from the ultrasound machine 204, convert the raw data into videos and/or images and transmit the videos and/or images to the computer 202 for processing. The computer 202 is connected to an external hard disk drive 208 which can be used as a local database for automatically storing these ultrasound videos and/or images, and/or other data in relation to an operation of a Support Vector Machine (SVM) for use in processing these received videos and/or images.

The ultrasound machine 204 is connected to an ultrasound probe 210 which is used to transmit and receive ultrasound waves as described above, for imaging anatomical structures in the patient. In addition, the entire system 200 can be placed on a retractable computer stand 212 which allows a height of the computer 202 and/or ultrasound machine 204 to be adjusted to cater for the needs of the user.

In the following description, the ultrasound imaging system 100 is described for use in relation to an ultrasound-guided neuraxial procedure. However, it should be understood that the use of this system 100 can be extended to other anatomical sites including but not limited to regional blocks, airway, bodily imaging, or other anatomical features of the spine. As will be made clear in the following description, the ultrasound imaging system 100 provides a user a method to automatically determine a safe and direct insertion location and angle for performing the neuraxial procedure with real-time ultrasound guidance.

The computer 102 can be used as an addition to existing ultrasound setups, such as in the way as shown in FIG. 2. Using the ultrasound image stream collected from the video out port of existing ultrasound machines 104, the computer 102 is configured to determine the location of features relevant to the procedure and displays their locations on a user interface in real-time. Using the locations of these features relative to the ultrasound probe 108, the computer 102 is configured to determine whether the ultrasound probe's location and orientation is optimal for safe needle insertion into the neuraxial space for performing a neuraxial procedure.

By integrating the computer 102 and its accessories for obtaining ultrasound scans (e.g. videos and/or images) from the ultrasound machine 104, computer-implemented methods, which use artificial intelligence (AI) techniques, for identifying anatomical features of the spine for use in guiding a user in a neuraxial procedure can be attained. These are described below in relation to FIGS. 4 and 5. In particular, the computer 102 is configured to interact with the user via a user interface for guiding the user through the neuraxial procedure in identifying an optimal location and/or tilt angle for performing the neuraxial procedure. This includes spinal level identification by using paramedian sagittal ultrasound images of the spine, and neuraxial space identification by using transverse ultrasound images at an optimal spinal level for use in identifying the optimal location and/or tilt angle for performing the neuraxial procedure. By using the system 100, the needle can also be tracked from the transverse ultrasound images in real time during the needle insertion process. The system 100 also provides an offline function for analysing existing ultrasound videos or images which can be useful in fine tuning the methods of FIGS. 4 and 5 below.

The system 100 and its associated computer-implemented methods therefore provide the following advantages.

First, the system 100 provides access to the neuraxial procedure for less experienced user (e.g. less experienced anesthetist or doctor), who with the aid of the system 100 and its associated computer-implemented methods are able to perform the neuraxial procedure with a similar amount of accuracy and success as experienced user. Particularly, it is noted that determining a location for needle insertion of a neuraxial procedure is a difficult task which requires a large amount of experience. With the aid of the system 100, important features of the spine are automatically labelled, and the user is guided in a step-by-step manner to first locate the optimal spinal level for the needle insertion and then to achieve an optimal horizontal position and tilt angle for performing the neuraxial procedure. In this way, the entire neuraxial procedure can be sped up, while maintaining a consistency and an accuracy of the neuraxial procedure. Further, provision of a systematic step-by-step guided procedure also enhances a success rate of the procedure, thereby improving patient experiences and reducing occurrences of complications and unnecessary discomfort as a result of multiple failed injection attempts. Further, the system 100 also aids in the neuraxial procedure in difficult cases involving obese patients and/or patients who have spinal conditions.

Second, the system 100 provides a compact addition to current ultrasound systems, thereby allowing easy integration into present clinical workflows. The system 100 is also designed to be plug and play, and therefore requires only connections of the computer 102 to a video-out port of the ultrasound machine 104 and the ultrasound probe 108 to a probe input port of the ultrasound machine 104.

Third, through its intuitive user interface and workflow, the system 100 aids in speeding up the training of less experienced user by providing indications of the various morphological features on the ultrasound images which can be easily recognized by the less experienced users. In this way, a cost for training less experienced users can also be reduced.

FIG. 3 shows block diagram of the computer 102 of the system 100 of FIG. 1.

As shown in FIG. 3, the computer 102 is a computer system with memory that stores computer program modules which implement a computer-implemented method for identifying a neuraxial space in a spine. The computer 102 comprises a processor 302, a working memory 304, an input module 306, an output module 308, a user interface 310, program storage 312 and data storage 314. The processor 302 may be implemented as one or more central processing unit (CPU) chips. The program storage 312 is a non-volatile storage device such as a hard disk drive which stores computer program modules such as a spinal landmark identification module 316. The computer program modules are loaded into the working memory 204 for execution by the processor 202. The input module 306 is an interface which allows data, for example video and/or image data of ultrasound videos and/or images captured in the ultrasound machine 104 etc., to be received by the computer 102. The output module 308 is an output device which allows data and results of analysis processed by the spinal landmark identification module 316 to be output. The output module 308 may be coupled to a display device or a printer. The user interface 310 allows a user of the computer 102 to input selections and commands and may be implemented as a graphical user interface. A user interface for use in relation to the spinal landmark identification module 316 is shown and described in more detail in relation to FIG. 6 below.

The program storage 312 stores the spinal landmark identification module 316. The spinal landmark identification module 316 causes the processor 302 to execute various simulation and analysis processes which are described in more detail in relation to FIGS. 4 and 5. The program storage 312 may be referred to in some contexts as computer readable storage media and/or non-transitory computer readable media. As depicted in FIG. 3, the spinal landmark identification module 316 is depicted as a single module for performing the computer-implemented methods of the present invention. However, it will be appreciated that the boundary set here is exemplary only, and that alternative embodiments may impose a decomposition of functionality of modules. For example, the spinal landmark identification module 316 discussed herein may be decomposed into sub-modules to be executed as multiple computer processes, and, optionally, on multiple computers. Moreover, alternative embodiments may combine multiple instances of a particular module or sub-module. It will also be appreciated that, while a software implementation of the computer program modules is described herein, these may alternatively be implemented as one or more hardware modules (such as field-programmable gate array(s) or application-specific integrated circuit(s)) comprising circuitry which implements equivalent functionality to that implemented in software.

The data storage 314 stores various model data for implementation by the spinal landmark identification module 316. As shown in FIG. 3, the data storage 314 has storage for a sacrum identification model 320, an interspinous space identification model 322, a panorama stitching model 324, a neuraxial space identification model 326 and a neuraxial space depth calculation model 328. The sacrum identification model 320 stores data in relation to identifying if an image of a portion of a spine as obtained in a paramedian sagittal ultrasound image includes a sacrum. This includes historical data of morphological features used to distinguish the sacrum, such as a contour linearity, a size, a centre location and/or an area. The interspinous space identification model 322 stores data in relation to features for identifying an interspinous space in the spine. For example, the interspinous space identification model 322 includes data for identifying laminas between different spinal levels for use in a template matching method. The panorama stitching model 324 stores data in relation to determining if a further or a subsequent paramedian sagittal ultrasound image is suitable to be stitched to a leading end of a panorama image, for example, data in relation to calculating a cross-correlation strength between a further paramedian sagittal ultrasound image and the leading end of the panorama image. The neuraxial space identification model 326 stores data in relation to extracting features of the spine from the transverse ultrasound image (e.g. a distinct pattern associated with the neuraxial space) and extracting midline features of the spine. The neuraxial space depth calculation model 328 stores data in relation to calculating a depth of the neuraxial space in the spine.

Although the technical architecture is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture to provide the functionality of a number of servers that is not directly bound to the number of computers in the technical architecture. In an embodiment, the functionality disclosed above may be provided by executing an application and/or applications in a cloud computing environment. Cloud computing may comprise providing computing services via a network connection using dynamically scalable computing resources. A cloud computing environment may be established by an enterprise and/or may be hired on an as-needed basis from a third party provider.

Methods in Relation to Identifying a Neuraxial Space in a Spine

Figure 4:
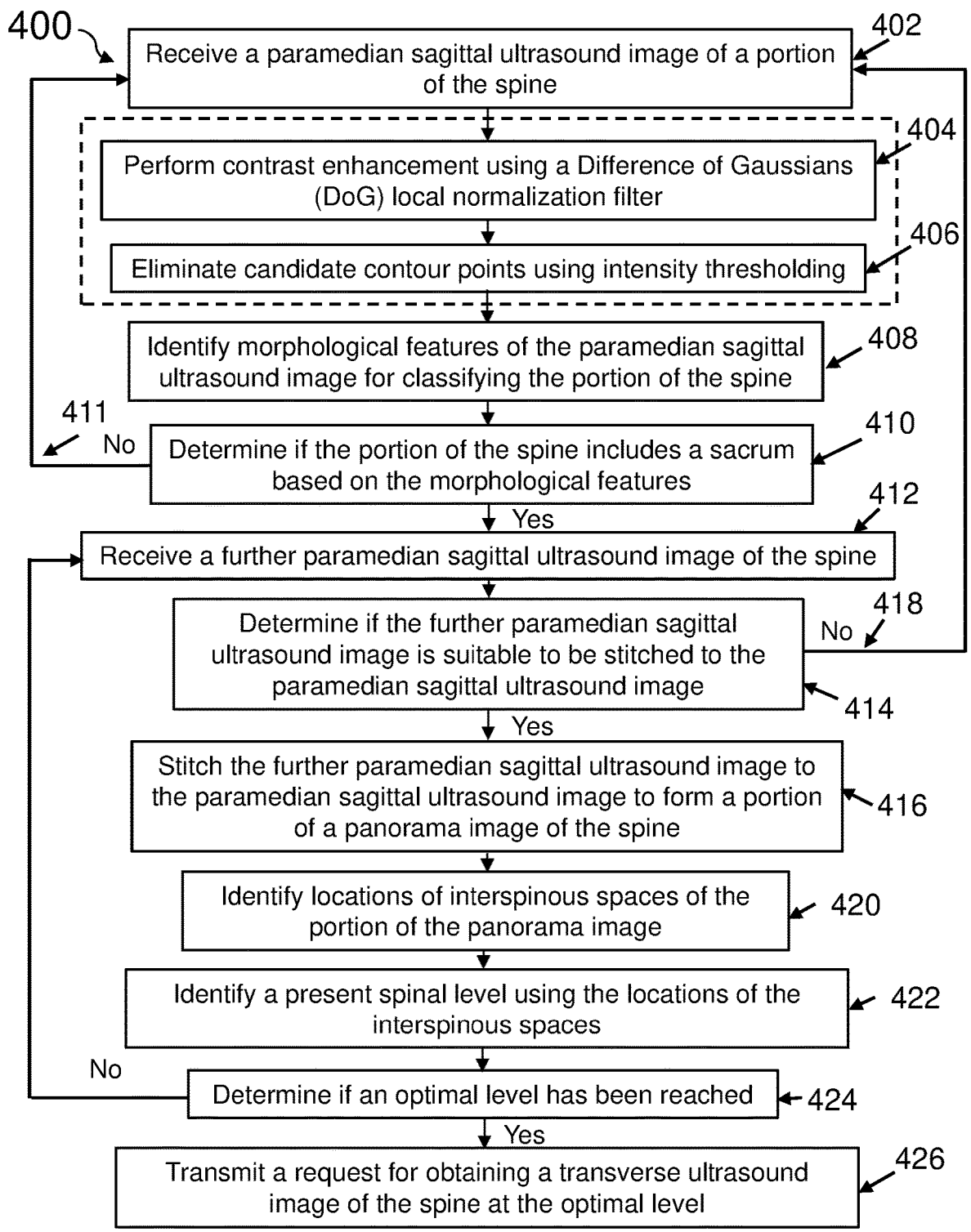
FIG. 4 shows steps of a method for determining an optimal level of the spine for needle insertion.
Figure 5:
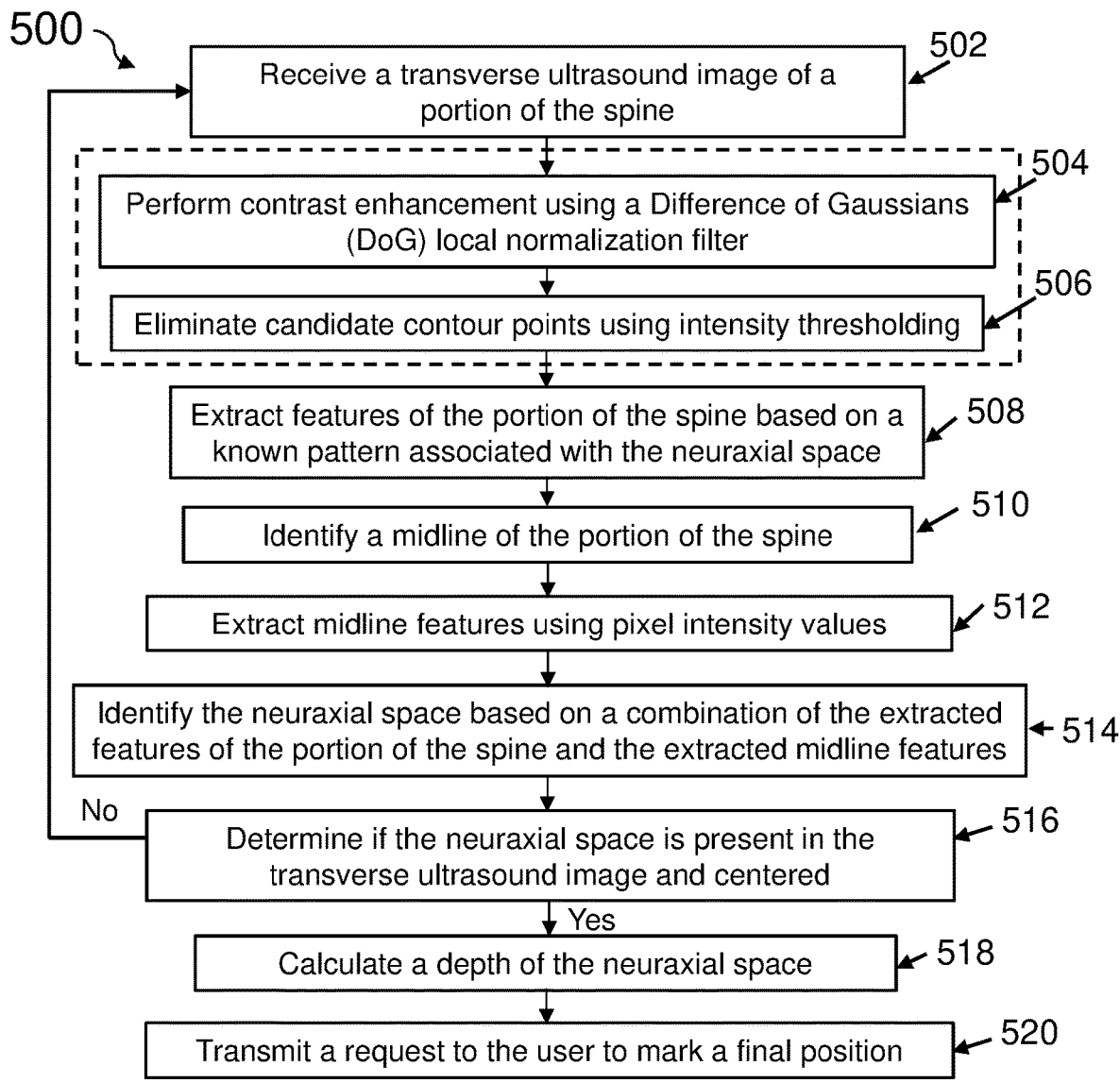
FIG. 5 shows steps of a method for identifying a neuraxial space in the spine at the optimal level of the spine determined using the method of FIG. 4.

FIGS. 4 and 5 show methods 400, 500 in relation to identifying a neuraxial space in a spine as performed by the ultrasound imaging system 100 of FIG. 1. Particularly, FIG. 4 relates to a method 400 for the identification of an optimal level of the spine for performing a neuraxial procedure, while FIG. 5 relates to a method 500 of identifying the neuraxial space for inserting a needle in performing the neuraxial procedure. It is appreciated that each of these methods 400, 500 can be performed independently of each other. For example, a skilled user (e.g. an experienced doctor or anaesthetist) can identify the optimal level of the spine for performing the neuraxial procedure by palpation of the spine manually without using the method 400 of FIG. 4.

Referring to FIG. 4, in a step 402, the computer 102 receives a paramedian sagittal ultrasound image of a portion of the spine from the ultrasound machine 104. Once the paramedian sagittal ultrasound image is received in the step 402, in the present embodiment, the paramedian sagittal ultrasound image is processed to reduce noise and/or any unwanted artefacts in the image. The processing of the paramedian sagittal ultrasound image is performed using optional steps 404 and 406. In a step 404, contrast enhancement of the paramedian sagittal ultrasound image is performed using a Difference of Gaussians (DoG) local normalization filter to remove speckle noises and enhance the contrast of anatomical structures of the portion of the spine as shown in the paramedian sagittal ultrasound image. In a step 406, the contrast-enhanced paramedian sagittal ultrasound image undergoes further processing to eliminate candidate contour points. This is performed by binary thresholding and can be followed by morphological transformations, specifically dilation and erosion.

In a step 408, the spinal landmark identification module 316 of the computer 102 is arranged to identify morphological features of the paramedian sagittal ultrasound image for classifying the portion of the spine, particularly for determining if the paramedian sagittal ultrasound image shows a sacrum of the spine. Typically, in a longitudinal or paramedian sagittal view of the spine, a sacrum is illustrated as a bright echoic line, which has a more significant length as compared to other anatomical spinal structures. Given its characteristics in shape, morphological features associated with the sacrum can be used to classify the sacrum.

In a step 410, the spinal landmark identification module 316 of the computer 102 is arranged to determine if the paramedian sagittal ultrasound image includes a sacrum based on the identified morphological features of the step 408. Examples of the morphological features used include contour linearity, size, centre location, and/or area. In the present embodiment, in order to determine if the paramedian sagittal ultrasound image includes a sacrum based on the identified morphological features, a machine learning algorithm is used.

Particularly, historical data of these morphological features were obtained from images of video recordings of several healthy subjects collected during previous studies for building the sacrum identification model 320 (e.g. an image database) by sampling and annotating images from the video streams. Based on this historical data, a Support Vector Machine (SVM) classifier was trained to classify and determine if contours identified in the paramedian sagittal ultrasound image belong to that of a sacrum. The SVM classifier is a supervised learning algorithm which seeks a decision boundary (or separating hyperplane) with maximal margin for the training set. The SVM classifier was trained using morphological features of the contours collected from these healthy subjects. Contours representing the sacrum were labelled as '1' and contours representing other structures were labelled as '0'. After training, the trained SVM classifier is stored in the computer 102 or the database 106 for real-time sacrum detection.

Therefore, during an ultrasound scan of the spine, the extracted morphological features associated with each visible anatomical structure of the paramedian sagittal ultrasound images obtained from the ultrasound machine 104 can be fed into the trained SVM classifier for determining if the investigated anatomical structure includes the sacrum in real time.

Once it is determined that the paramedian sagittal ultrasound image includes a sacrum, a panorama image of the spine can be built using the sacrum as a starting point. The panorama image can then be used in identifying spinal levels of the spine and therefore an optimal level of the spine for performing the neuraxial procedure. Alternatively, if it is determined that the paramedian sagittal ultrasound image does not include a sacrum, in a step 411, the computer 102 is configured to prompt the user to reposition the ultrasound probe 108 and rescan the spine to provide another paramedian sagittal ultrasound image for the step 402.

In a step 412, the computer 102 receives a further paramedian sagittal ultrasound image of the spine from the ultrasound machine 104 if it is determined that the portion of the spine of the paramedian sagittal ultrasound image includes a sacrum in the step 410. Although not shown in the method 400, the further paramedian sagittal ultrasound image received in the step 412 can be filtered, for example by using the steps 404 and 406, for obtaining a good image quality. In a step 414, the spinal landmark identification module 316 is arranged to determine if the further paramedian sagittal ultrasound image received in the step 412 is suitable to be stitched to the paramedian sagittal ultrasound image to form a portion of the panorama image of the spine. To do so, a location of a lamina of the spine is first identified via template matching using data stored, for example, in the interspinous space identification model 322. Based on the morphological features and the location of the lamina extracted, interspinous spaces can be recognised. Interspinous spaces are spaces in between the laminas of different spinal levels. To determine if the further paramedian sagittal ultrasound image is suitable to be stitched to the paramedian sagittal ultrasound image with a good image quality, the further paramedian sagittal ultrasound image is selected based on the template matching result for the lamina, as well as a cross-correlation strength between the further paramedian sagittal ultrasound image and the previously processed paramedian sagittal ultrasound image (e.g. in this case, it will be the paramedian sagittal ultrasound image of the sacrum).

If it is determined that the further paramedian sagittal ultrasound image is suitable to be stitched to the paramedian sagittal ultrasound image in the step 414, the spinal landmark identification module 316 is configured to stitch the further to the paramedian sagittal ultrasound image to form a portion of the panorama image of the spine in a step 416. If it is determined that the further paramedian sagittal ultrasound image is not suitable to be stitched to the paramedian sagittal ultrasound image in the step 414, in a step 418, the computer 102 is configured to prompt the user to reposition the ultrasound probe 108 and rescan the spine to obtain another paramedian sagittal ultrasound image for the step 402. In other words, the process restarts again from the step 402 as shown in FIG. 4.

In a step 420, the spinal landmark identification module 316 is configured to identify locations of the interspinous spaces of the portion of the panorama image. This is achieved by calculating a shift or motion between the further paramedian sagittal ultrasound image and a leading edge of the paramedian sagittal ultrasound image using a phase correlation method, and transforming coordinates of a centre of the ultrasound probe 108 in respect of the portion of the panorama image.

Once the locations of the interspinous spaces are identified in the step 420, the spinal landmark identification module 316 is configured to identify a present spinal level of the spine accordingly, using the locations of the interspinous spaces. This can be achieved by counting the number of interspinous spaces from the sacrum to a leading paramedian sagittal ultrasound image.

At this point, it will be appreciated that although the method for stitching the further paramedian sagittal ultrasound image to the paramedian sagittal ultrasound image to form a portion of a panorama image is described, to form the panorama image, subsequent paramedian sagittal ultrasound image frames are stitched progressively along the scan. In fact, as subsequent paramedian sagittal ultrasound images are stitched progressively to form the panorama image, the number of the interspinous levels can be counted and the current spinal level can be identified.

In a step 424, the spinal landmark identification module 316 of the computer 102, is configured to determine if an optimal level of the spine has been reached. This can be achieved by counting the spinal level in the step 422. In the present embodiment, the optimal level of the spine is at a location of the L3-L4 interspinous space of the spine. If it is determined that the optimal level of the spine has not been reached, the spinal landmark identification module 316 of the computer 102, is configured to return to the steps 412 to 422 as shown in FIG. 4. Once it is determined that the optimal level has been reached in the step 424, the spinal landmark identification module 316 of the computer 102, is configured to notify the user that the optimal level of the spine has been reached and to transmit a request to the user for obtaining a transverse ultrasound image at the optimal level in a step 426.

FIG. 5 shows steps of the method 500 for identifying a neuraxial space at the optimal level of the spine determined by the method 400 of FIG. 4.

Once the optimal spinal level is identified at the step 426 of the method 400, the spinal landmark identification module 316 of the computer 102, is configured to receive a transverse ultrasound image of a portion of the spine in a step 502. To do so, the spinal landmark identification module 316 is configured to prompt the user to rotate the ultrasound probe 106 along a longitudinal axis of the ultrasound probe by 90 degrees for generating the transverse ultrasound image in a transverse view of the portion of the spine. It should be noted that in the present embodiment, where the optimal level is at the L3-L4 interspinous space of the spine, a distinct 'flying bat' type of pattern characterising this interspinous space is expected to be obtained for the transverse ultrasound image.

Similar to the steps 404 and 406 of the method 400, once the transverse ultrasound image is obtained in the step 502, in the present embodiment, the transverse ultrasound image is processed to reduce noise and/or any unwanted artefacts in the image. The processing of the transverse ultrasound image can be performed using optional steps 504 and 506. In a step 504, contrast enhancement of the transverse ultrasound image is performed using a Difference of Gaussians (DoG) local normalization filter to remove speckle noises and enhance the contrast of anatomical structures of the spine as shown in the transverse ultrasound image. In a step 506, contrast-enhanced transverse ultrasound image undergoes further processing to eliminate candidate contour points. This is performed by binary thresholding and can be followed by morphological transformations, specifically dilation and erosion. The steps 504 and 506 advantageously reduce an effect of noise in the transverse ultrasound image and enhances anatomy structures or features which are critical for the identification of the neuraxial space.

In a step 508, the spinal landmark identification module 316 is configured to extract features of the portion of the spine from the transverse ultrasound image based on a distinct pattern associated with the neuraxial space. Particularly, in the transverse ultrasound image plane as captured by the transverse ultrasound image, the neuraxial space is typically characterized by a 'flying bat' alike pattern (see e.g. FIG. 10). Based on this distinct pattern, the spinal landmark identification module 316 is configured to identify and extract a set of features from the transverse ultrasound image. This is also known as template matching technique where a group of templates of the distinct pattern are pre-prepared based on clinical knowledge from experienced sonographers and are used to correlate with the transverse ultrasound image to identify the features of the neuraxial space. In the present embodiment, the features extracted include one or more of: a depth of a posterior complex, a depth of an anterior complex, a normalized cross-correlation strength of the posterior complex, a normalized cross-correlation strength of the anterior complex, a location of a left articular process, a location of a right articular process, a normalized cross-correlation value of a left articular process, and a normalized cross-correlation value of a right articular process. In addition, two additional features for template matching can be extracted for identifying the neuraxial space and these include the horizontal position of the posterior and anterior complexes. These additional features extracted aid to avoid false positive results which may arise in cases where spinous images produce contours whose shape and depth resemble the ligamentum flavum/vertebral body, resulting in similar depth and normalized cross-correlation values obtained in an interspinous image.

In a step 510, the spinal landmark identification module 316 is configured to identify a midline of the portion of the spine in the transverse ultrasound image. The midline is a line spanning from the top of the transverse ultrasound image to the bottom of the transverse ultrasound image, and it can be identified by using a cost function associated with a presence of white pixels within a predefined scanning window of the transverse ultrasound image. The scanning window is associated with an area which spans equal distance from the right and the left side of the midline. The midline is determined by calculating the cost function for a series of variable pairs and selecting the line which provides a minimal cost function. The variable pairs are associated with (i) a starting point at a first row of the transverse ultrasound image and (ii) an angle created between a vertical axis of the transverse ultrasound image and the midline. Each variable pair fixes a location of the midline. The cost function used includes a first term associated with a depth of the pixels and a second term associated with a position of the midline in relation to a centre of the transverse ultrasound image.

In a step 512, the spinal landmark identification module 316 is configured to extract midline features using pixel intensity values along the midline. Particularly the midline features along the midline can be used to differentiate between an ultrasound image of a bone and an ultrasound image of a neuraxial space. Particularly, for the image of a bone, the midline appears as a dark anechoic region as the spinous process blocks the ultrasound waves from travelling deeper into the body. In contrast, for the image of a neuraxial space, the ligamentum flavum, the vertebral body, and parts of the articular process are visible along the midline and are shown as bright areas in the transverse ultrasound image. In the present embodiment, the midline features extracted in the step 512 include a ratio of black pixels in the predefined window of the transverse ultrasound image and a ratio of white pixels below the posterior complex in the transverse ultrasound image.

In a step 514, the spinal landmark identification module 316 is configured to identify the neuraxial space based on a combination of the extracted features of the portion of the spine of the transverse ultrasound image and the extracted midline features. Particularly, the combination of the extracted features is fed into the SVM classifier and these extracted features are compared with historical data of these features stored in the neuraxial space identification model 326 for identifying the neuraxial space. The historical data used for identifying the neuraxial space using the method 500 were obtained from video and/or image recordings of several healthy subjects collected during previous studies. Once these historical data are obtained, an image database of the neuraxial space identification model 326 can be built by sampling and annotating images from these video and/or image streams. Particularly, each of these sampled images are labelled independently, for example, '1' for interspinous images and '−1' for spinous images and other images not suitable for needle insertion. In this way, the SVM classifier can be trained and stored in the neuraxial space identification model 326 of the computer 102 for use in real-time neuraxial space identification. Subsequently, when a transverse ultrasound image is obtained during a scan of the spine, the combination of extracted features from the transverse ultrasound image can be fed into the SVM classifier for identifying the neuraxial space.

In a step 516, the spinal landmark identification module 316, by using the SVM classifier stored in the neuraxial space identification model 326, is configured to determine if the neuraxial space is present in the transverse ultrasound image and centred. If it is determined in the step 516 that the neuraxial space is not present and centred in the transverse ultrasound image, the spinal landmark identification module 316 is configured to prompt the user to adjust a position of the ultrasound probe 108 for obtaining another transverse ultrasound image, and the process for determining if a neuraxial space is present and centred in this transverse ultrasound image repeats from the step 502 to the step 516. Alternatively, if it is determined that the neuraxial space is present and centred in the transverse ultrasound image, the spinal landmark identification module 316 is configured to calculate a depth of the neuraxial space in a step 518 and to transmit a request to the user to mark a final position of the location for performing the neuraxial procedure in a step 520.

As described in relation to the methods 400 and 500, identification and/or extraction of the morphological features from the longitudinal and transverse ultrasound images of the spine requires the spinal landmark identification module 316 to be able to determine these features by using historical data stored in the sacrum identification model 320, the interspinous space identification model 322, and the neuraxial space identification model 326.

Preliminary studies have been conducted using the system 100 for performing the neuraxial procedure, using the methods 400, 500. In these preliminary studies, the user (for example, an anaesthetist) was tasked to use the spinal landmark identification module 316 to determine an optimal needle insertion point and angle prior to insertion and the estimated depth of the neuraxial space. The needle insertion was conducted by the user, with guidance provided by the spinal landmark identification module 316 which includes information of the needle location, a tilt angle for needle insertion and an estimated neuraxial depth for the needle insertion.

The spinal landmark identification module 316 is configured to detect the features relevant to the neuraxial procedure and display their locations on a user interface in real time. With the locations of these features relative to the ultrasound probe 108, the program can conclude whether the probe's location and orientation is optimal for safe needle insertion towards the neuraxial space. These obtained results would then be reflected on the user interface to first instruct the user to move up along the spine until the ultrasound probe 108 is at the optimal spinal level, i.e. the L3-L4 interspinous space, and subsequently to instruct the user to rotate the ultrasound probe 90 degrees at the optimal spinal level to obtain the transverse view of the spine for identifying the neuraxial space and obtaining an optimal alignment for needle insertion. After the scan of each patient, the ultrasound videos and/or images are saved in the computer 102 or the database 106 (e.g. an external hard disk drive). Moreover, the longitudinal panorama images of the spine as generated are also saved. These ultrasound videos and/or images are used for the fine-tuning and/or training of the models 320, 322, 326.

Figure 6:
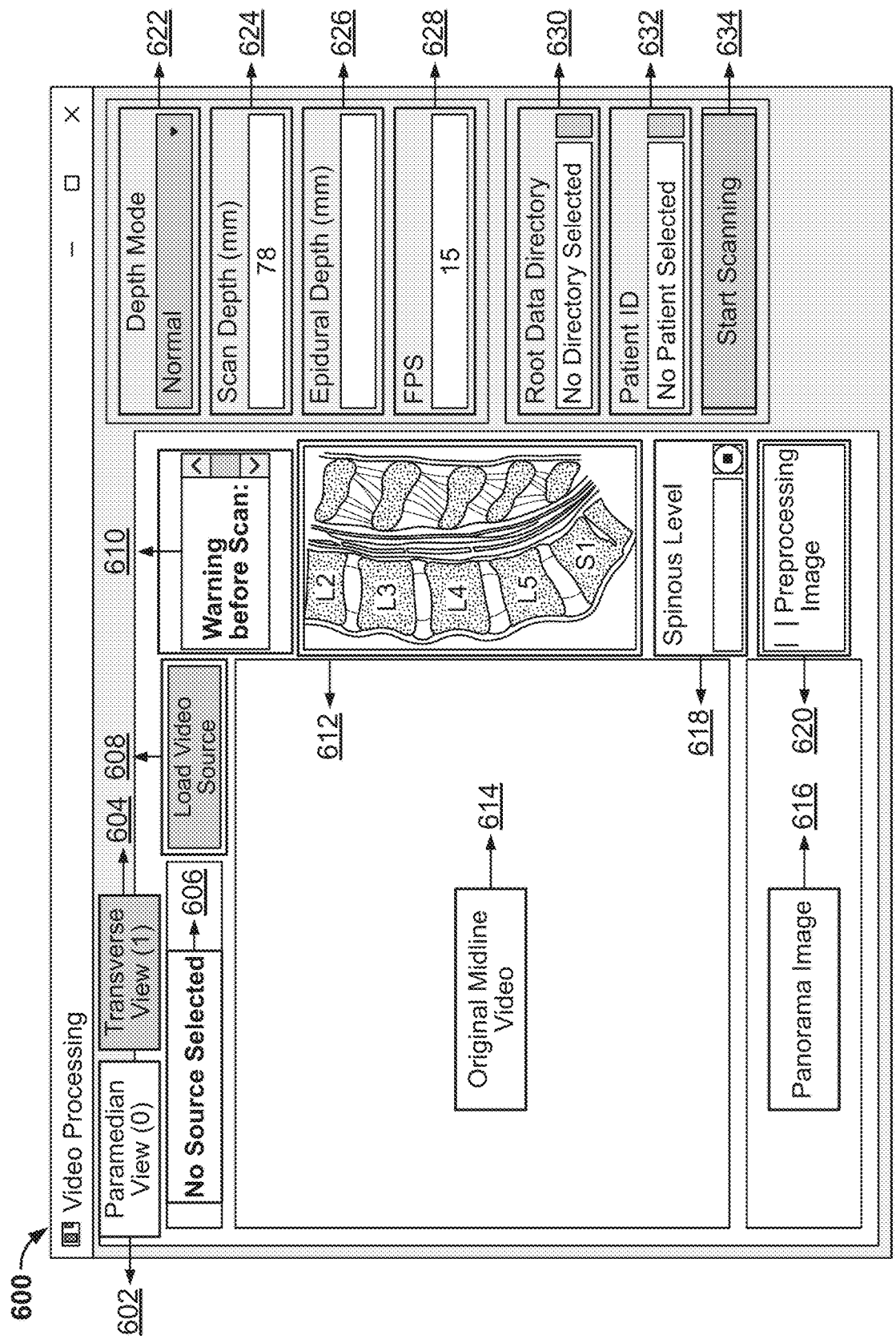
FIG. 6 shows an illustration of a user interface on the computer of FIG. 3.

FIG. 6 shows an illustration of a user interface 600 on the computer 102 of FIG. 1. The user interface 600 relates to different functions provided by the spinal landmark identification module 316 as described in relation to the methods 400, 500 above. The present screenshot of the user interface 600 as shown in FIG. 6 relates to an interface shown in a longitudinal paramedian view (e.g. for obtaining a paramedian sagittal ultrasound image). Actual screenshots of the user interface 600 in both the longitudinal paramedian view and a transverse view of the spine are shown and described in relation to FIGS. 7 and 9 below.

Referring to FIG. 6, tabs 602 and 604 are used to switch between a longitudinal paramedian view of the spine and a transverse view of the spine. An indication 606 functions to present information or instructions to the user. A function key 608 functions to enable the user to select a source for a video input and load the video input into the module 316. The video input can be an offline, existing ultrasound video file stored in the computer 102 or a live ultrasound scan obtained from the ultrasound machine 104. It would be appreciated by the skilled person that a video comprises a plurality of frames in a time sequence where each of the plurality of frames can be extracted as an ultrasound image. A box 610 functions to provide warnings to the user if necessary. A box 612 shows an illustration of a portion of a spine which is used to indicate in real time an exact spinous level that is reached by the ultrasound probe 108. A needle shape will appear during the scanning process to indicate a current spinal level reached by the ultrasound probe 108. A window 614 functions to show an ultrasound video and/or image with anatomical landmarks detected by the module 316 overlaid on the ultrasound video and/or image. A window 616 functions to present a stitched panorama image of the spine. The window 616 shows in real time the panorama image as paramedian sagittal ultrasound images are stitched to an leading edge of a portion of the panorama image. A section 618 functions to indicate an exact spinous level reached by the ultrasound probe in real time. A check box 620 provides the user with an option to view a pre-processed image (e.g. contrast enhanced) which provides clarity to the features of the ultrasound image.

The module 316 also provides a function to cater for different scanning depth. This is shown in a box 622 which allows a user to select two different modes—a normal mode and an obese mode. In the normal mode (e.g. for regular size patient), a scanning depth of 78 mm is used, while in the obese mode, a scanning depth of 92 mm is used. By having the two different modes, the module 316 is configured to take into account poorer ultrasound image quality obtained for obese patients and to adjust the image analysis accordingly. When either mode is selected, the scanning depth used for the ultrasound machine will be adjusted automatically, and this is shown in a box 624. For example, when the normal mode is selected, the scanning depth indicated in the box 624 will be 78 mm. If the obese mode is selected, the scanning depth of 92 mm will be shown.

A box 626 indicates an estimated neuraxial depth by the programme after scans in the longitudinal paramedian view and the transverse view of the spine were performed. A box 630 provides an indication of the frame per second (FPS) of the video captured in the programme, which is set as a default value of the ultrasound machine 104.

A box 632 provides a means for the user to name and edit a patient ID for labelling the scans so that the captured scans or images can be identified later. A folder for each patient ID is created automatically in a root data directory of the computer 102 for storing these scans. Finally a button 634 is used to start or stop a scanning process by the programme. Once the scanning process is initiated by pressing on the button 634, the same button 634 will be changed to read "Stop Scanning". To suspend the scanning procedure, the button 634 can be clicked again. Once the scanning procedure is suspended, the button 634 will return to read "Start Scanning".

As described above, the user interface 600 highlights anatomical structures of the spine which are relevant to a neuraxial procedure. Furthermore, it provides visual and audio alerts for important events during the procedure, including the moment when the ultrasound probe 108 is at the L3-L4 interspinous space and the moment when the probe angle and orientation of the ultrasound probe 108 is optimal for performing the needle insertion.

By using the user interface 600, a user (e.g. an anaesthetist or a doctor) who administers the neuraxial procedure is first guided to locate the sacrum of the spine. Once the sacrum of the spine is located, the user is instructed to move up or down along the spine until the ultrasound probe 108 is at the optimal spinal level, in this instance, the L3-L4 interspinous space of the spine. The user interface 600 is configured to alert the user when the optimal spinal level has been reached by the ultrasound probe 108. This process is performed using the method 400 as described above. Once the ultrasound probe 108 is at the optimal spinal level, the user is instructed to adjust the angle of the ultrasound probe 108 and to fine tune the location until an optimal alignment is achieved. The user interface 600 will alert the user when this optimal alignment has been achieved. At this point, the module 316 calculates a depth of the target neuraxial space. This subsequent process for identifying the neuraxial space for optimal alignment of the needle is performed using the method 500 as described above.

Figure 7:
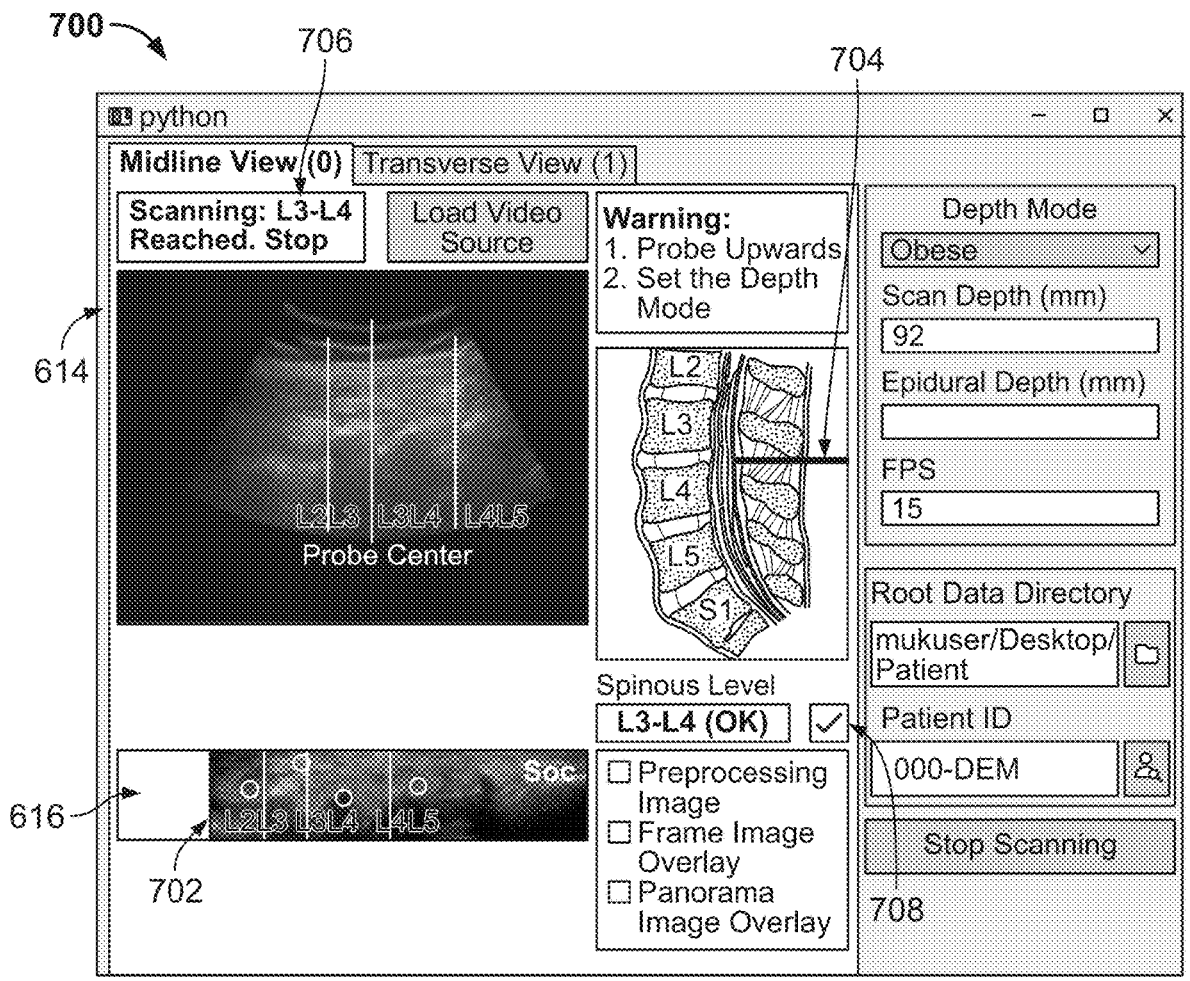
FIG. 7 shows an illustration of the user interface for a paramedian sagittal ultrasound image of the spine obtained at the optimal level of the spine as identified by the method of FIG. 4.
Figure 8:
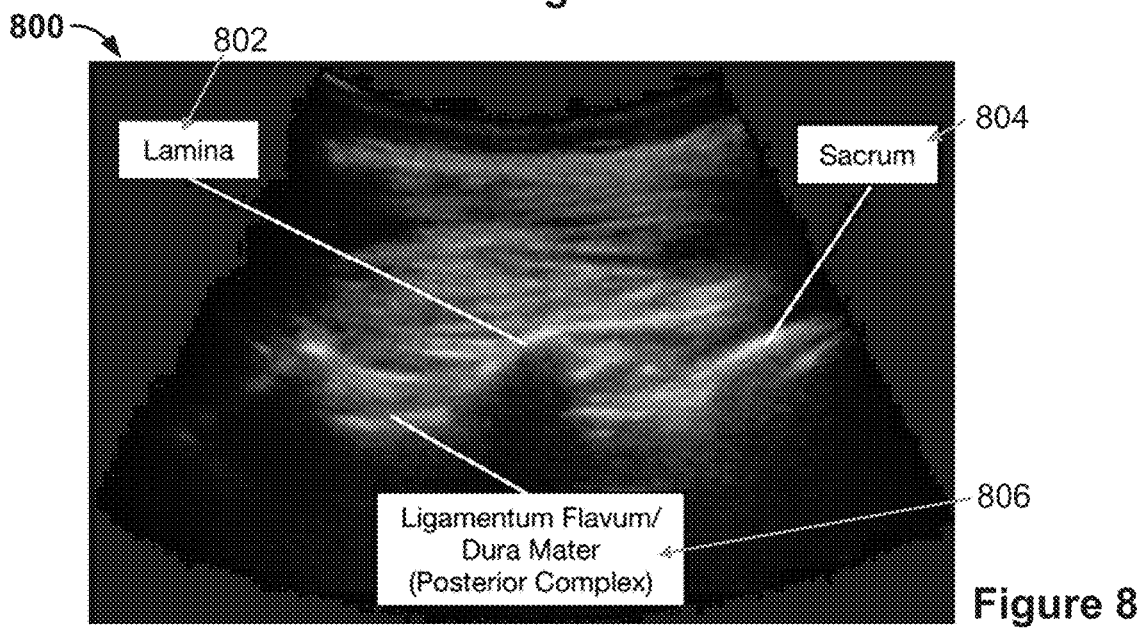
FIG. 8 shows an example of a paramedian sagittal ultrasound image of the spine for identifying the optimal level of the spine using the method of FIG. 4.
Figure 9:
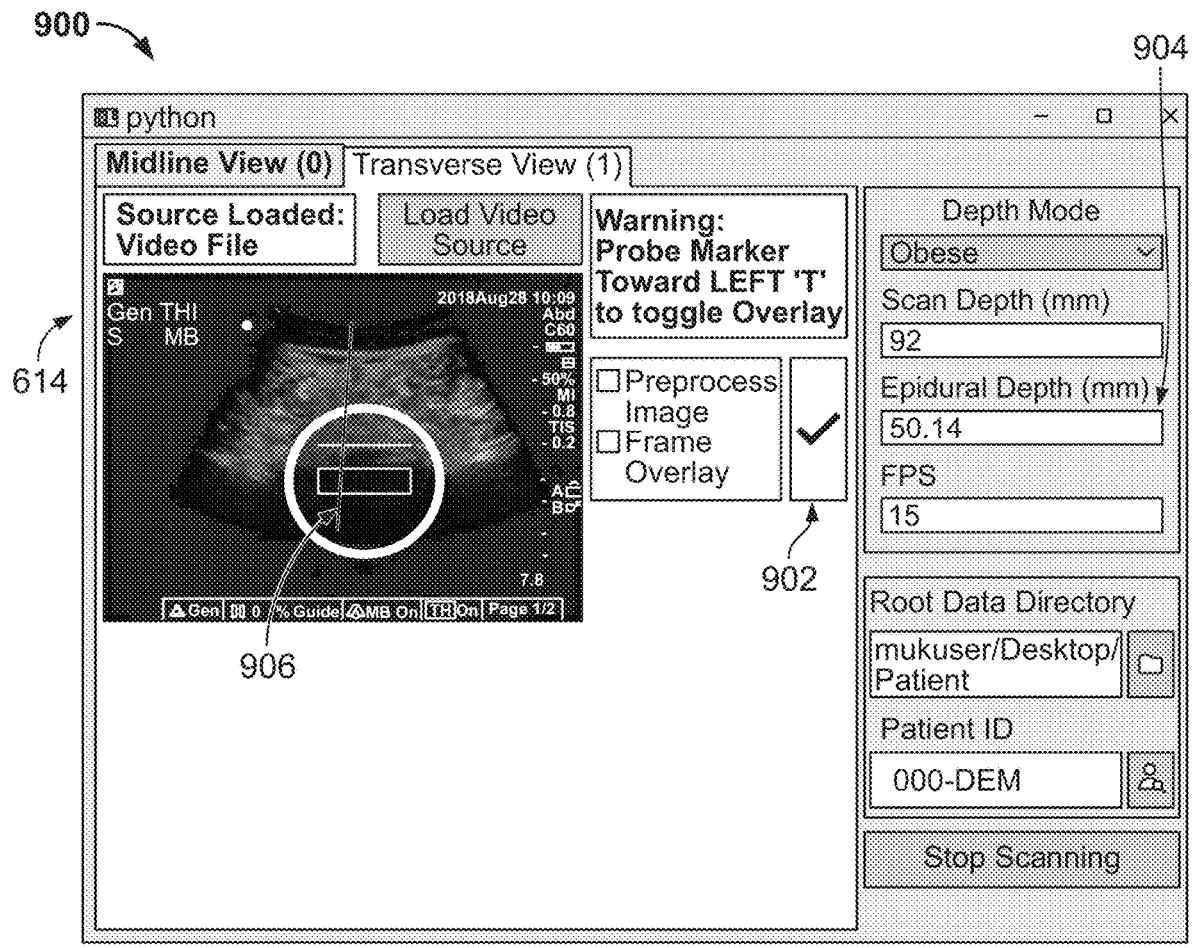
FIG. 9 shows an illustration of the user interface for a transverse ultrasound image of the spine for identifying the neuraxial space using the method of FIG. 5.
Figure 10:
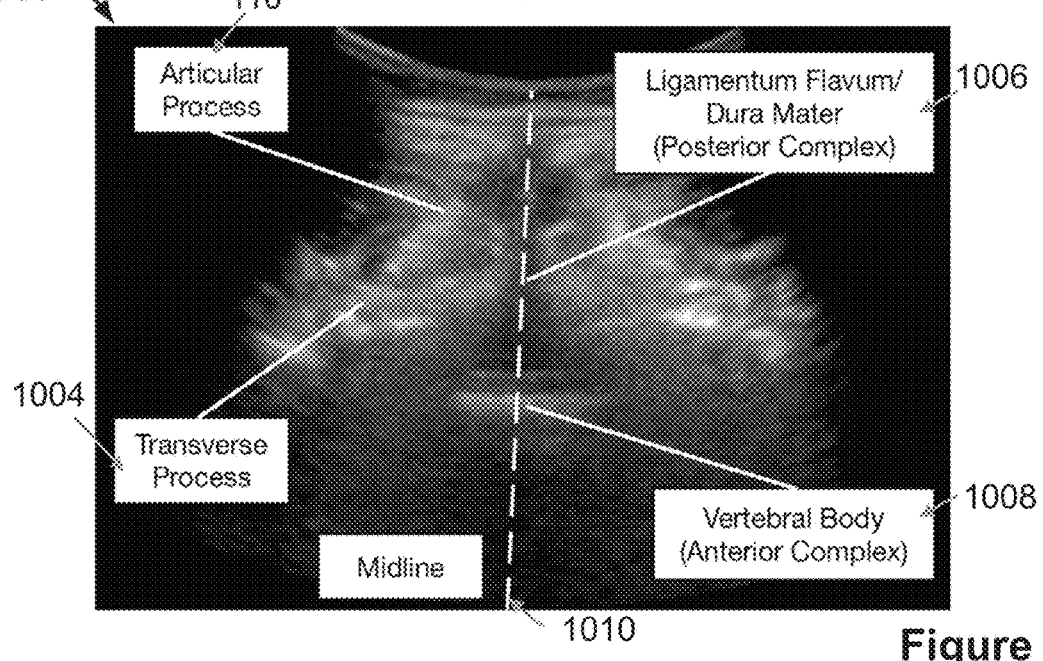
FIG. 10 shows an example of a transverse ultrasound image of the spine for identifying the neuraxial space using the method of FIG. 5.

FIGS. 7 to 10 show examples of ultrasound images obtained during clinical trials. FIGS. 7 and 8 show paramedian sagittal ultrasound images of the spine, while FIGS. 9 and 10 show transverse ultrasound images of the spine. FIGS. 7 and 9 are examples of screenshots of the user interface 600 taken during the clinical trials and are used to further illustrate the functional features seen on the user interface 600 during the neuraxial procedure.

FIG. 7 is a screenshot 700 illustrating the user interface 600 for a paramedian sagittal ultrasound image of a portion of the spine obtained at the optimal level of the spine as identified by the method 400 of FIG. 4.

Referring to FIG. 7, as shown in the box 614 of the user interface 600, the paramedian sagittal ultrasound image is displayed. In the box 616 of the user interface 600, a panorama image of the spine is displayed. As described in relation to the method 400 of FIG. 4 above, paramedian sagittal ultrasound images obtained are stitched progressively, starting from an identified paramedian sagittal ultrasound image of the sacrum, to form the panorama image. The interspinous levels are indicated on the panorama image as shown. In the box 612 of the user interface 600, an illustration of the spine provides an indication 704 of a current level of the ultrasound probe 108. Similar information is also indicated in the box 606 of the user interface 600 where it reads "Scanning: L3-L4 Reached. Stop" to provide an alert to the user that the optimal spinal level L3-L4 has been reached and advise the user to stop the ultrasound probe 108. In addition, an indication 708 is also provided in the window 618 of the user interface 600 to inform the user that the L3-L4 spinal level has been reached.

FIG. 8 shows an example of a paramedian sagittal ultrasound image of a portion of the spine for identifying the optimal level of the spine using the method of FIG. 4. A number of anatomical features of the portion of the spine are labelled for information. From the paramedian sagittal ultrasound image 800, a lamina 802 of the spine can be identified. The location of the lamina is used, for example, to identify a location of the interspinous space. The sacrum 804 of the spine is also identified in the paramedian sagittal ultrasound image 800. As described above, the sacrum forms a starting point for the panorama image and is used as a reference for counting spinal levels to locate the optimal level of the spine for performing the neuraxial procedure. A ligamentum flavum/dura mater (posterior complex) 806 is also identified in the paramedian sagittal ultrasound image 800.

FIG. 9 shows an illustration of the user interface 600 for a transverse ultrasound image of a portion of the spine for identifying the neuraxial space using the method 500 of FIG. 5. The transverse ultrasound image of the spine is taken at the optimal level (i.e. L3-L4 interspinous space). The user interface 600 shares some common features (e.g. features 622-634) between the longitudinal paramedian view and the transverse view tabs of the user interface 600.

Referring to FIG. 9, as shown in the box 614 of the user interface 600, the transverse ultrasound image is displayed. At this point, the user is guided to fine-tune a position and tilt angle of the ultrasound probe 108 until an optimal alignment is achieved. This can be achieved using the method 500 as described above, by identifying the neuraxial space in the spine at the optimal spinal level. Once the optimal alignment is achieved, the user interface 600 prompts the user by showing a tick in a box 902, indicating that the optimal alignment of the ultrasound probe 108 is achieved. At this point, the spinal landmark identification module 316 calculates and displays a depth of the neuraxial space at a box 904. In the transverse ultrasound image displayed on the user interface 600, indications 906 of the midline and other anatomical features are also shown to aid the user in performing the neuraxial procedure. The user can then mark a final position for performing the neuraxial procedure on the patient and carry out the neuraxial procedure as per conventional practice.

FIG. 10 shows an example of a transverse ultrasound image of a portion of the spine for identifying the neuraxial space using the method of FIG. 5. A number of anatomical features of in this transverse ultrasound image are labelled for information. Referring to the transverse ultrasound image 1000 of the portion of the spine, an articular process 1002, a transverse process 1004, a ligamentum flavum/dura mater (posterior complex) and a vertebral body (anterior complex) 1008 can be identified. These identified features are used for identifying the neuraxial space of the portion of the spine as described in relation to the method 500 of FIG. 5. In addition, a midline 1010 can be identified in the transverse ultrasound image. Features of the midline 1010 are also used in identifying the neuraxial space.

Alternative embodiments of the invention include: the ultrasound probe 108 being a wireless ultrasound probe. Further, the ultrasound probe 108 may include a clamping system arranged to fix a needle onto the ultrasound probe for performing a neuraxial procedure. The clamping system may include a clip based on a spring loading mechanism where the clip is designed for fixing the needle onto it securely. The clip also allows the needle to be easily decoupled from the probe. The clip can be rotated freely and locked by a locking system achieved by a ball-joint mechanism so that the needle can be positioned in an optimal position and angle for the procedure. Particularly, once the optimal needle insertion location and alignment has been determined, an epidural or spinal needle can be easily snapped onto the ultrasound probe 108, and insertion can be conducted in-plane through the middle of the ultrasound probe 108 in real-time. During insertion, the system 100 monitors a location of the needle tip in the ultrasound image in real-time and estimate its distance from the neuraxial space. At the same time, the user can use a conventional loss of resistance technique for determining an insertion depth of the needle. The real time ultrasound display allows the loss of resistance to be visualized in the user interface on the computer 102, which aids in indicating to the user when advancement of the needle should stop. Once the needle has entered the neuraxial or spinal space, the needle can easily be detached and uncoupling from the ultrasound probe 108, and the neuraxial procedure and medication administration can be administered in a conventional manner. In an embodiment, the clamping system attached to the ultrasound probe 108 can be in the form of a cover which can be easily clipped on to the ultrasound probes. In other embodiments, the clamping system is integral with the ultrasound probe 108.

Although only certain embodiments of the present invention have been described in detail, many variations are possible in accordance with the appended claims. For example, features described in relation to one embodiment may be incorporated into one or more other embodiments and vice versa. Further, although the exemplary embodiments provided above are specific to the identification of the neuraxial space, it should be appreciated that the systems and methods described may also be applicable to other anatomical features of the spine, such as an articular process, an anterior complex, a posterior complex and an interspinous space. For example, as described in relation to FIG. 4 above, the interspinous space can be identified by identifying laminas between different spinal levels using a template matching method. Further, it will be appreciated by a skilled person in the art that the steps 502 to 514 as described in relation to FIG. 5 for the identification of the neuraxial space can equally be applied to other anatomical features of the spine. For example, to generalise, features of the portion of the spine can be extracted based on a known pattern of an anatomical feature of the spine of interest and these extracted features can be used in combination with the extracted midline features of step 512 in order to identify the anatomical feature of the spine in the transverse ultrasound image. This generalised method may be applied for example to the articular process, the anterior complex and the posterior complex of the spine. Accordingly, it will be appreciated by the skilled person that the system 300 can be modified so as to accommodate identification of the anatomical feature of the spine of interest. For example, other models such as an articular process identification model and/or an anterior complex identification model can be included in the system 300.

The invention claimed is:

1. An ultrasound imaging method for identifying an anatomical feature of a spine, the method comprising:
   receiving, by a processor, a transverse ultrasound image of a portion of the spine;
   extracting, by the processor, features of the portion of the spine from the transverse ultrasound image based on a distinct pattern associated with the anatomical feature of the spine;
   identifying, by the processor, a midline of the portion of the spine in the transverse ultrasound image;
   extracting, by the processor, midline features using pixel intensity values of the transverse ultrasound image; and
   identifying, by the processor based on a combination of the extracted features of the portion of the spine and the extracted midline features, the anatomical feature in the transverse ultrasound image,
   wherein the anatomical feature of the spine includes a neuraxial space,
   wherein the extracted features of the portion of the spine include one or more of: a depth of a posterior complex, a depth of an anterior complex, a normalized cross-correlation strength of the posterior complex, a normalized cross-correlation strength of the anterior complex, a location of a left articular process, a location of a right articular process, a normalized cross- correlation value of a left articular process, a normalized cross-correlation value of a right articular process, and a horizontal position of the posterior complex, and a horizontal position of the anterior complex, and
   wherein the extracted midline features include a ratio of black pixels in a predefined window and a ratio of white pixels below the posterior complex.

2. The method of claim 1, wherein identifying the midline of the portion of the spine comprises using, by the processor, a cost function associated with a presence of white pixels within the predefined window of the transverse ultrasound image, wherein the cost function includes a first term associated with a depth of the pixels and a second term associated with a position of the midline in relation to a centre of the transverse ultrasound image.

3. The method of claim 1, further comprising pre-processing, by the processor, the transverse ultrasound image prior to extracting features of the portion of the spine and the midline.

4. The method of claim 1, further comprising:
   calculating, by the processor, a depth of the neuraxial space; or identifying, by the processor, the neuraxial space using a Support Vector Machine (SVM) classifier.

5. The method of claim 4, wherein the neuraxial space is identified using the SVM classifier, the method further comprises training, by the processor, the SVM classifier using historical data associated with the features of the portion of the spine and the midline features.

6. A computer readable medium storing processor executable instructions which when executed on a processor cause the processor to carry out a method according to claim 1.

7. An ultrasound imaging method for identifying an anatomical feature of a spine, the method comprising:
   receiving, by a processor, a transverse ultrasound image of a portion of the spine;

extracting, by the processor, features of the portion of the spine from the transverse ultrasound image based on a distinct pattern associated with the anatomical feature of the spine;

identifying, by the processor, a midline of the portion of the spine in the transverse ultrasound image;

extracting, by the processor, midline features using pixel intensity values of the transverse ultrasound image;

identifying, by the processor based on a combination of the extracted features of the portion of the spine and the extracted midline features, the anatomical feature in the transverse ultrasound image;

receiving, by the processor, a paramedian sagittal ultrasound image of another portion of the spine;

identifying, by the processor, morphological features of the paramedian sagittal ultrasound image for classifying the another portion of the spine, the morphological features comprise one or more of: a contour linearity, a size, a centre location and an area of the paramedian sagittal ultrasound image; and determining, by the processor based on the identified morphological features, if the another portion of the spine includes a sacrum, wherein identifying the morphological features of the paramedian sagittal ultrasound image comprises identifying, by the processor, the morphological features using template matching, and the method further comprises:

identifying, by the processor, an interspinous space based on the identified morphological features of the paramedian sagittal ultrasound image, or wherein the another portion of the spine is determined to include the sacrum, the method further comprises:

receiving, by the processor, a further paramedian sagittal ultrasound image of the spine;

determining, by the processor based on template matching of (i) laminas of the spine in the paramedian sagittal ultrasound image and the further paramedian sagittal ultrasound image and (ii) a cross relation strength between the paramedian sagittal ultrasound image and the further paramedian sagittal ultrasound image, if the further paramedian sagittal ultrasound image is suitable to be stitched to the paramedian sagittal ultrasound image; and stitching, by the processor, the further paramedian sagittal ultrasound image to the paramedian sagittal ultrasound image to form a portion of a panorama image of the spine if it is determined that the further paramedian sagittal ultrasound image is suitable to be stitched to the paramedian sagittal ultrasound image.

8. The method of claim 7, wherein the portion of the panorama image is formed, and the method further comprises:

identifying, by the processor, locations of interspinous spaces of the portion of the panorama image; and identifying, by the processor, spinal levels using the locations of the interspinous spaces.

9. The method of claim 8, wherein identifying locations of interspinous spaces of the portion of the panorama image further comprises:

calculating, by the processor, a motion between the further paramedian sagittal ultrasound image and a leading edge of the paramedian sagittal ultrasound image using phase correlation; and transforming, by the processor, coordinates of a centre of an ultrasound probe in respect of the portion of the panorama image.

10. The method of claim 9, further comprising:

determining, by the processor, if the ultrasound probe is at an optimal level of the spine based on the identified spinal levels; and transmitting, by the processor, a request for obtaining the transverse ultrasound image of the portion of the spine if the ultrasound probe is at the optimal level.

11. The method of claim 7, further comprising pre-processing, by the processor, the paramedian sagittal ultrasound image prior to identifying the morphological features.

12. The method of claim 11, wherein pre-processing the paramedian sagittal ultrasound image comprises performing, by the processor, a contrast enhancement on the paramedian sagittal ultrasound image using a Difference of Gaussians (DoG) local normalization filter or eliminating, by the processor, candidate contour points in the paramedian sagittal ultrasound image using intensity thresholding.

13. An ultrasound imaging system for identifying an anatomical feature of a spine, the system comprising:

an ultrasound probe arranged to scan the spine for a transverse ultrasound image of a portion of the spine; and a computer comprising a processor and a data storage storing computer program instructions operable to cause the processor to:

receive the transverse ultrasound image of the portion of the spine;

extract features of the portion of the spine from the transverse ultrasound image based on a distinct pattern associated with the anatomical feature of the spine;

identify a midline of the portion of the spine in the transverse ultrasound image;

extract midline features using pixel intensity values of the transverse ultrasound image; and identify, based on a combination of the extracted features of the portion of the spine and the extracted midline features, the anatomical feature in the transverse ultrasound image, wherein the anatomical feature of the spine includes a neuraxial space, wherein the extracted features of the portion of the spine include one or more of: a depth of a posterior complex, a depth of an anterior complex, a normalized cross-correlation strength of the posterior complex, a normalized cross-correlation strength of the anterior complex, a location of a left articular process, a location of a right articular process, a normalized cross-correlation value of a left articular process, a normalized cross-correlation value of a right articular process, and a horizontal position of the posterior complex, and a horizontal position of the anterior complex, and wherein the extracted midline features include a ratio of black pixels in a predefined window and a ratio of white pixels below the posterior complex.

14. The system of claim 13, wherein the ultrasound probe comprises a clamping system arranged to attach a needle to the ultrasound probe for performing a neuraxial procedure.

15. The system of claim 14, wherein the clamping system comprises a clip for attaching the needle using a spring loading mechanism and a locking mechanism for locking a position of the clip to fix a position and an angle of the needle, or wherein the clamping system is in a form of a cover for the ultrasound probe.

* * * * *